US008775621B2

(12) United States Patent
Seiferth et al.

(10) Patent No.: US 8,775,621 B2
(45) Date of Patent: Jul. 8, 2014

(54) POLICY SERVICES

(75) Inventors: Frank Seiferth, Toronto (CA); Vincent Chi Chiu Wong, Mississauga (CA); Rebecca Yuen Man Wong, Richmond Hill (CA); Nigel Reginald Back, Munich (DE); Bohdan Zabawskyj, Woodbridge (CA)

(73) Assignee: Redknee Inc., Mississauga (CA)

( * ) Notice: Subject to any disclaimer, the term of this patent is extended or adjusted under 35 U.S.C. 154(b) by 1163 days.

(21) Appl. No.: 11/626,111

(22) Filed: Jan. 23, 2007

(65) Prior Publication Data

US 2008/0059635 A1   Mar. 6, 2008

Related U.S. Application Data

(60) Provisional application No. 60/841,381, filed on Aug. 31, 2006.

(51) Int. Cl.
*G06F 15/16* (2006.01)
*G06F 15/173* (2006.01)

(52) U.S. Cl.
USPC ........................................... 709/226; 709/217

(58) Field of Classification Search
USPC .................. 709/223–226, 217–219
See application file for complete search history.

(56) References Cited

U.S. PATENT DOCUMENTS

| 6,473,622 | B1 | 10/2002 | Meuronen |
| 6,611,875 | B1 | 8/2003 | Chopra et al. |
| 6,615,262 | B2 | 9/2003 | Schweitzer |
| 6,621,793 | B2 | 9/2003 | Widegren |
| 6,661,780 | B2* | 12/2003 | Li .................................. 370/324 |
| 6,667,780 | B2 | 12/2003 | Cho |
| 6,714,515 | B1 | 3/2004 | Marchand |
| 6,718,380 | B1* | 4/2004 | Mohaban et al. .............. 709/223 |
| 6,775,267 | B1 | 8/2004 | Kung |
| 6,785,534 | B2 | 8/2004 | Ung |
| 6,847,708 | B1* | 1/2005 | Abbasi et al. .............. 379/114.2 |
| 6,891,811 | B1 | 5/2005 | Smith |
| 6,895,235 | B2 | 5/2005 | Padgett et al. |
| 6,947,531 | B1 | 9/2005 | Lewis |
| 7,003,307 | B1 | 2/2006 | Kupsh |
| 7,039,037 | B2 | 5/2006 | Wang |
| 7,107,068 | B2 | 9/2006 | Benzon |
| 7,139,387 | B2 | 11/2006 | Dahari |

(Continued)

FOREIGN PATENT DOCUMENTS

| DE | 10148540 A1 | 4/2003 |
| EP | 1026853 A1 | 8/2000 |

(Continued)

OTHER PUBLICATIONS

3GPP, "3GPP TS 23.125 V2.0.0," Mar. 2004, 3GPP.*

(Continued)

*Primary Examiner* — Afshawn Towfighi
(74) *Attorney, Agent, or Firm* — Gardner, Linn, Burkhart & Flory, LLP

(57) ABSTRACT

A method and system for applying policies to services is provided. An embodiment includes a method for applying services wherein a request from a subscriber for a particular service is received. The request is compared with a policy to ascertain whether or not access to the particular service is permitted, and, if permitted, if there are any restrictions or limitations to that access.

24 Claims, 8 Drawing Sheets

(56) References Cited

U.S. PATENT DOCUMENTS

| | | |
|---|---|---|
| 7,194,235 B2 | 3/2007 | Nykanen et al. |
| 7,215,970 B2 | 5/2007 | Corrigan |
| 7,269,431 B1 | 9/2007 | Gilbert |
| 7,272,133 B2 | 9/2007 | Valin et al. |
| 7,340,214 B1 | 3/2008 | Hamberg |
| 2001/0026553 A1 | 10/2001 | Gallant |
| 2001/0053687 A1 | 12/2001 | Sivula |
| 2001/0055291 A1 | 12/2001 | Schweitzer |
| 2002/0052754 A1 | 5/2002 | Joyce |
| 2002/0103925 A1 | 8/2002 | Sheth |
| 2002/0107754 A1 | 8/2002 | Stone |
| 2002/0126701 A1 | 9/2002 | Requena |
| 2002/0152319 A1 | 10/2002 | Amin |
| 2002/0152321 A1 | 10/2002 | Le |
| 2002/0176378 A1* | 11/2002 | Hamilton et al. ............. 370/328 |
| 2003/0003932 A1 | 1/2003 | Corrigan |
| 2003/0009580 A1 | 1/2003 | Chen |
| 2003/0035409 A1 | 2/2003 | Wang |
| 2003/0051041 A1 | 3/2003 | Kalavade |
| 2003/0069922 A1 | 4/2003 | Arunachalam |
| 2003/0074286 A1 | 4/2003 | Rodrigo |
| 2003/0083990 A1* | 5/2003 | Berg et al. ....................... 705/40 |
| 2003/0096605 A1 | 5/2003 | Schlieben |
| 2003/0105720 A1* | 6/2003 | Ishibashi ........................ 705/52 |
| 2003/0105864 A1 | 6/2003 | Mulligan et al. |
| 2003/0112936 A1 | 6/2003 | Brown |
| 2003/0134615 A1 | 7/2003 | Takeuchi |
| 2003/0157925 A1 | 8/2003 | Sorber |
| 2003/0158902 A1 | 8/2003 | Volach |
| 2003/0187996 A1 | 10/2003 | Cardina |
| 2003/0207686 A1 | 11/2003 | Ramanna |
| 2003/0214958 A1 | 11/2003 | Madour |
| 2004/0022191 A1* | 2/2004 | Bernet et al. ................... 370/230 |
| 2004/0028005 A1 | 2/2004 | Madour |
| 2004/0028055 A1 | 2/2004 | Madour et al. |
| 2004/0066769 A1 | 4/2004 | Ahmavaara |
| 2004/0092250 A1 | 5/2004 | Valloppillil |
| 2004/0092272 A1 | 5/2004 | Valloppillil |
| 2004/0095924 A1 | 5/2004 | Holur |
| 2004/0105424 A1 | 6/2004 | Skoczkowski |
| 2004/0117312 A1 | 6/2004 | Lialiamou |
| 2004/0127215 A1* | 7/2004 | Shaw ........................... 455/432.1 |
| 2004/0236686 A1* | 11/2004 | Bohmer et al. ................. 705/40 |
| 2005/0002407 A1 | 1/2005 | Shaheen et al. |
| 2005/0100035 A1 | 5/2005 | Chiou |
| 2005/0131984 A1* | 6/2005 | Hofmann et al. ............. 709/201 |
| 2005/0185661 A1 | 8/2005 | Scott et al. |
| 2005/0185664 A1* | 8/2005 | Chaskar et al. ............... 370/445 |
| 2005/0195743 A1 | 9/2005 | Rochberger |
| 2005/0272465 A1 | 12/2005 | Ahmavaara |
| 2006/0008063 A1 | 1/2006 | Harnesk |
| 2006/0028980 A1 | 2/2006 | Wright |
| 2006/0031297 A1 | 2/2006 | Zuidema |
| 2006/0034281 A1* | 2/2006 | Cain et al. ..................... 370/390 |
| 2006/0039374 A1 | 2/2006 | Belz |
| 2006/0072595 A1 | 4/2006 | Broberg et al. |
| 2006/0075467 A1 | 4/2006 | Sanda |
| 2008/0013531 A1 | 1/2008 | Elliott et al. |

FOREIGN PATENT DOCUMENTS

| | | |
|---|---|---|
| EP | 1117265 A1 | 7/2001 |
| EP | 1278359 A2 | 1/2003 |
| EP | 1278383 A2 | 1/2003 |
| EP | 1298599 A1 | 4/2003 |
| EP | 1309213 A1 | 5/2003 |
| EP | 1320214 A1 | 6/2003 |
| EP | 1278359 A3 | 6/2004 |
| EP | 1278359 B1 | 3/2007 |
| WO | 0163883 A2 | 8/2001 |
| WO | 0169891 A1 | 9/2001 |
| WO | 03032618 A1 | 4/2003 |
| WO | 03037023 A1 | 5/2003 |
| WO | 03047164 A2 | 6/2003 |
| WO | 2007/138407 A2 | 12/2007 |

OTHER PUBLICATIONS

Fonknechten D et al. "Service Aware Intelligent GGSN" Alcatel Telecommunications Review, No. Q4 2003, Oct. 1, 2003, pp. 1-10.

Dippelhofer A: "Flexible Abrechnung" Jan. 17, 2003, pp. 34-36, XP001164781, ISSN:0016-2814.

Lin, Y et al.: "Mobile Prepaid Phone Services" IEEE Personal Communications, Jun. 2000, pp. 6-4, XP011092391.

Ganna, M. et al. "On using policies for managing services provisioning in agent-based heterogeneous environments for mobile users" Sixth IEEE International Workshop on Policies for Distributed Systems and Networks, Jun. 6-8, 2005; pp. 149-158.

Salkintzis A. et al. "Seamless multimedia QoS across UMTS and WLANs", IEEE 61st Vehicular Technology Conference, VTC, May 30-Jun. 1, 2005, vol. 4, pp. 2284-2288.

Cheung, M. et al. "Applying a service-on-demand policy management framework to an ETTx environment", IEEE/IFIP Network Operations and Management Symposium, 2004, NOM 2004, Apr. 19-23, 2004, vol. 2, pp. 101-114.

International Search Report for International Application No. PCT/CA2007/002372, mailed Sep. 10, 2008.

3GPP TS 23.203 V7.4.0. "3rd Generation Partnership Project; Technical Specification Group Services and System Aspects; Policy and Charging Control Architecture" (release 7) Sep. 26, 2007 Retrieved From The Internet: <htt://www.3gpp.orgIft/Specslarchivel23_series3.203/23203-740.zip> pp. 11-30,42,47-48,58-59.

"3rd Generation Partnership Project; Technical Specification Group Services and System Aspects; \End-to-end Quality of Service (QoS) concept and architecture (Release 6)", 3GPP Standard; 3GPP TS 23.207, 3RD Generation Partnership Project (3GPP), Mobile Competence Centre; 650, Route Des Lucioles; F-06921 Sophia-Antipolis Cedex, France, No. V6.6.0, Sep. 1, 2005, pp. 1-53, XP050363153, *Section 5 "End-toEnd QoS Architecture".

European Patent Application 07800552.7 Search Report dated Jun. 1, 2012.

* cited by examiner

POLICY SERVICES

PRIORITY CLAIM

The present application claims priority under 35 U.S.C. §119(e) to U.S. Provisional Patent Application No. 60/841,381, filed Aug. 31, 2006, the entire contents of which are incorporated herein by reference.

FIELD OF THE INVENTION

The present invention relates generally to telecommunications and more particularly relates to a system, method and apparatus for applying policies to telecommunication services.

BACKGROUND OF THE INVENTION

Hardware advances in computing devices and the networks which interconnect those devices has facilitated an explosion in software applications. Applications such as real-time chat, voice and video are increasingly commonplace and widespread. Voice over Internet Protocol ("VOIP") telephony allows real-time duplex voice communications to be carried over traditional data channels, potentially obviating the need for traditional voice channels, without the latency or jitter normally associated with the specifications of such data channels.

While somewhat behind wireline networks, wireless networks are also increasing in bandwidth to allow substantially real-time chat, voice and video applications to be carried thereover. Likewise, the processing power of handheld portable devices such as cellular telephones and wireless personal digital assistants can now accommodate such applications.

Traditional revenue sources for wireline and wireless networks include voice telephony and traditional data communications. However, the above-mentioned advances are confusing the means by which network operators are compensated by consumers. For example, traditional voice channels were configured to be carried over twisted pair copper telephone wires, yet, technology advances now permit high speed Internet communications to be carried over twisted pair. Still further advances now permit voice communications to be carried over those Internet connections. As a result, the subscriber may eschew the underlying voice service in favor of the Internet service which now serves to provide both voice and traditional data connectivity for the subscriber. This erodes the underlying revenue base for the wireline carrier, whose business model may depend on charging separate fees for both voice and traditional data services. Hardware advances now raise the same possibility of erosion of revenue sources for wireless carriers, which originally offered only wireless voice connectivity but are increasing offering both voice and data connectivity. However the subscriber may be able to find applications to carry the voice service over the data link and thereby avoid charges for voice services.

The preceding examples are the tip of the iceberg. Applications such as Skype, Google Maps, You Tube, and file sharing services were unforeseen applications that can radically alter the bandwidth profiles for each subscriber, with deleterious effects on bandwidth and quality-of-service allocations which did not anticipate these services. The result can be serious deterioration of quality of service for some subscribers as other subscribers unfairly monopolize all available bandwidth.

As one solution, it is known to offer different subscribers different quality of service in exchange for differing prices. For example, a "gold" subscriber may pay $50 per month and receive five megabits/second of bandwidth, while a "silver" subscriber may pay $40 per month for four megabits/second of bandwidth. However, such plans still depend on bandwidth shaping models that assume certain characteristics of the underlying applications, whereby the entire bandwidth is not being used all of the time. Thus, the "silver" subscriber that runs an application which uses the entire four megabits/second all of the time, may still cause the "gold" subscriber to be deprived of the five megabits/second bandwidth that should be available to that "gold" subscriber.

SUMMARY OF THE INVENTION

An aspect of the invention provides a method for applying a policy to a service comprising:
maintaining a database representing a policy for accessing a plurality of services for a subscriber; each the service including at least one of an identity of a provider of the service and a type of the service; the policy indicating for each the service whether access to the service for the subscriber is permitted;
receiving a request from a client device operated by the subscriber for access to one of the services;
determining whether the request complies with the policy;
permitting the client device to access the service if the request complies with the policy; and,
denying the client device access to the service if the request does not comply with the policy.

The policy can include a maximum bit rate at which the one of the services can be accessed and the permitting step includes ensuring that the one of the services does not exceed the maximum bit rate.

The policy can include a predefined maximum volume and the permitting step includes monitoring a volume of data for the one of the services that can be accessed such that once the predefined maximum volume is reached then performing the denying step.

The policy can include a predefined maximum aggregate bit rate at which all services that can be accessed and the permitting step includes ensuring that the services to do not exceed the predefined maximum aggregate bit rate.

The policy can include a predefined maximum aggregate volume for all services that can be accessed by the client device and the permitting step includes monitoring a volume of data for the one of the services that can be accessed such that once the predefined maximum aggregate volume is reached then performing the denying step.

The policy can include a permitted usage period for the one of the services and performing the permitting step if the request occurs during the usage period and performing the denying step if the request does not occur during the usage period.

The method can further comprise the step of accessing billing rules associated with the one of the services and performing the permitting step only if access to the one of the services also complies with the billing rules and otherwise performing the denying step.

The billing rules can include whether the one of the services is accessible on a post-paid or pre-paid basis.

The billing rules can include a basic rate for accessing the one of the services.

The billing rules can include an excess rate for accessing the one of the services.

The billing rules can include a roaming rate for accessing the one of the services.

Another aspect of the invention provides a system for applying policies to services comprising a policy enforcement point and a client device in communication with the policy enforcement point. The system also comprises a network connected to or otherwise in communication with the policy enforcement point. The network is configured to provide one of a plurality of services to the client device. The system also comprises a policy server connected to or otherwise in communication with the policy enforcement point. The policy server is configured to maintain a database representing a policy for accessing the plurality of services for a subscriber operating the client device. Each service includes at least one of an identity of a provider of the service and a type of the service. The policy indicates for each the service whether access to the service for the subscriber is permitted. The policy enforcement point is configured to:

receive a request from the client device for access to one of the services;
determine whether the request complies with the policy;
permit the client device to access the service if the request complies with the policy; and,
deny the client device access to the service if the request does not comply with the policy.

The system can further comprise an accounting server connected to or otherwise in communication with the policy enforcement point and configured to maintain billing rules associated with the one of the services. The policy enforcement point can be configured to permit access to the one of the services only if the request also complies with the billing rules.

The policy enforcement point can be a general packet radio service (GPRS) support node ("GGSN") and the policy server is configured to appear to the GGSN as a billing server.

The policy enforcement point can be one of a packet serving data node (PDSN) for a code division multiple access (CDMA) based network; the Internet Protocol ("IP") edge router for a European Telecommunications Standards Institute ("ETSI") based network; the cable Modem termination system ("CMTS") for a PacketCable based network; an access service network ("ASN") gateway for a WiMax based network; and a deep-packet inspection node for a generic internet protocol based network.

BRIEF DESCRIPTION OF THE DRAWINGS

The present invention will now be described with reference to certain embodiments, which are by way of example only, and in relation to the attached Figures in which.

DETAILED DESCRIPTION OF THE EMBODIMENTS

Figure 1:
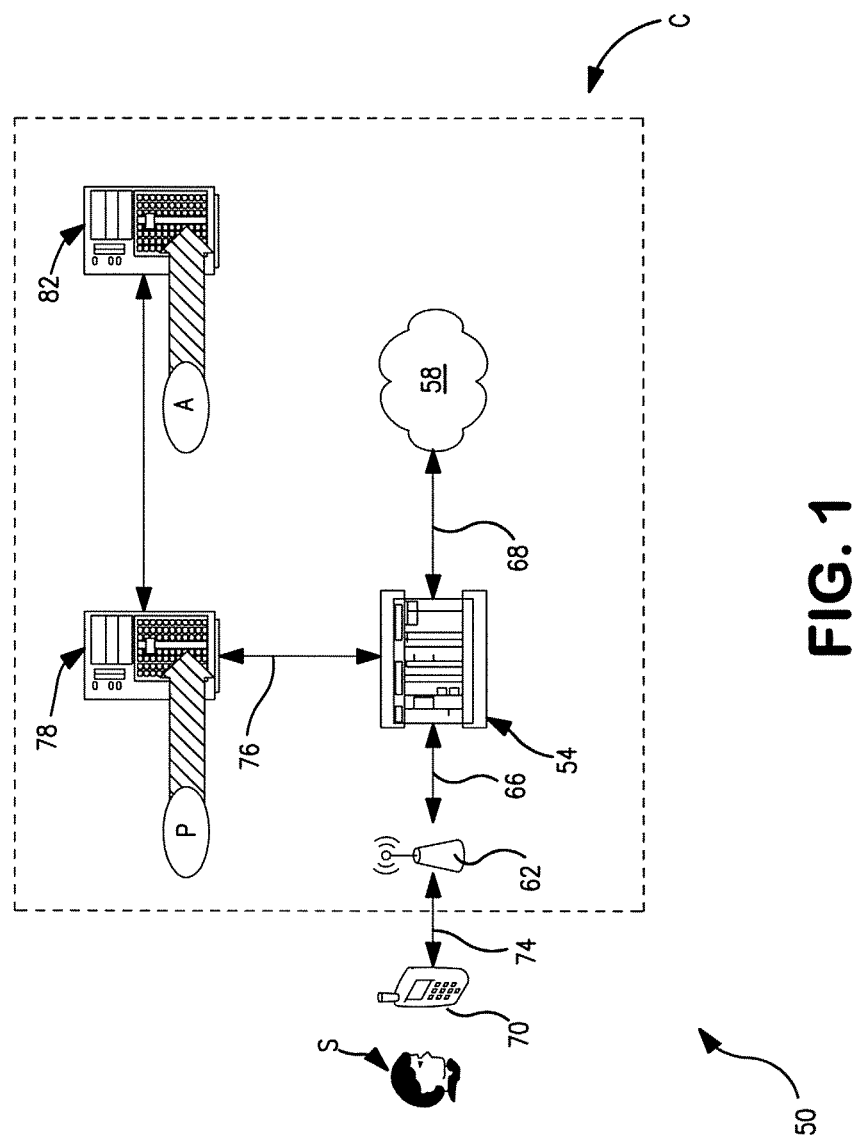
FIG. 1 shows a schematic representation of a system for applying policies to services.

Referring now to FIG. 1, a system for applying policies to services is indicated generally at 50. A service will generally comprise one or more bearer or signaling channels that can be routed via communications infrastructure for the purpose. A service can be invoked between subscribers (e.g. an instant messaging session or a voice over Internet Protocol call), between subscribers and service providers (e.g. the streaming of a music video from a service provider to a subscriber's device), or between communication servers (e.g. the transfer of multi-media data in a peer-to-peer environment between two or more computers).

System 50 comprises a gateway 54 which operates as a policy enforcement point. For the purpose of demonstrating one embodiment, system 50 is presented in the context of a contemporary general packet radio service (GPRS) wireless environment, whereby the policy enforcement point is manifested as a GPRS support node (GGSN) 54. GGSN 54 interconnects a data network 58 with at least one cellular base station 62. Network 58 can be any suitable type of data network, but in a present embodiment is the Internet. Those skilled in the art will recognize that the policy enforcement point features of gateway 54 can be manifested as other network elements in the context of other access technologies, for example, a packet serving data node (PDSN) for a code division multiple access (CDMA) based network; the Internet Protocol ("IP") edge router for a European Telecommunications Standards Institute ("ETSI") based network; the cable Modem termination system ("CMTS") for a PacketCable based network; a access service network ("ASN") gateway for a WiMax based network; or a deep-packet inspection node for a generic internet protocol based network; or the like.

A first backhaul 66 connects GGSN 54 to base station 62, while a second backhaul 68 connects GGSN to network 58. In turn, base station 62 is configured to communicate with at least one client device 70. Client device 70 is owned and operated by a subscriber S. Client device 70 can be based on a cellular telephone, a wireless personal digital assistant, a wireless email paging device, a laptop computer or the like. Client device 70 includes a microphone for receiving audio input and a speaker or other device for presenting audio output. Client device 70 also includes a display for presenting text or other visual images, and a keyboard for receiving alphanumeric input. Those skilled in the art will appreciate that many standard wireless client devices (e.g. Blackberry™ devices from Research in Motion of Waterloo, Canada; or cellular telephones from Nokia of Finland, or Motorola of Chicago, USA.) include all of the foregoing features.

A wireless link 74 connects base station 62 with client device 70. Wireless link 74 can be based on any known and suitable wireless protocol, but in a present embodiment is based on the Global System for Mobile communications ("GSM").

GGSN 54 also connects to a policy server 78 via a link 76. Policy server 78 is configured to maintain and apply various policies according to the flow of traffic on GGSN 54. In a present embodiment, link 76 is implemented using the known switching fabric and interfaces normally used to connect to a GGSN. As understood by those of skill in the art, GGSN 54 includes one or more DIAMETER or Remote Authentication Dial In User Service (RADIUS) based interfaces that permits GGSN 54 to be connected to or otherwise in communication with a billing server so that GGSN 54 can access billing information and selectively permit or deny access to various services based on that billing information. Those skilled in the art will recognize that alternative authentication, authorization and accounting interfaces and protocols may be used to connect the GGSN and the billing server. Those skilled in the art will recognize that vendors may implement proprietary variants of the interface between the policy enforcement point and the billing server that may include extensions or additional parametric attributes that relate to vendor specific functionality and capabilities. In the present embodiment, policy server 78 is configured to emulate the known billing server so that policy server 78 appears to GGSN 54 as a billing server and thereby permit introduction of policy server 78 without modification to GGSN 54. Policy server 78 is thus configured to receive communications from GGSN 54, and deliver communications to GGSN 54 in a manner that is transparent to GGSN 54. For example, policy server 78 would appear to GGSN 54 as the online charging system described in Section 6.1.1 of 3GPP TS 23.125 V2.0.0 © 2004, 3GPP Organization Partners, the entire contents of which are incorporated herein by reference. Likewise, policy server 78 could appear to GGSN 54 as an offline charging system based on the offline charging system described in Section 6.1.2 of 3GPP TS 23.125 V2.0.0.

Policy server 78, in turn, is connected to or otherwise in communication with an accounting server 82 which performs accounting functions including verifying, debiting and crediting account balances according to user references. (While in a present embodiment, policy server 78 is connected directly to accounting server 82, in other embodiments GGSN 54 can be connected to accounting server 82, in which case accounting server 82 can be incorporated into the known functionality of existing billing servers, previously discussed. Also, in other embodiments, policy server 78 may connect to other servers that assist in the implementation of policies stored on policy server 78. For example, a video encoding server, not shown, could be connected to policy server 78 to permit dynamic encoding of video streams in accordance with the optimal operating parameters of client device 70.) Policy server 78 and accounting server 82 which will each be discussed in greater detail below. Based on the foregoing, subscriber S can access content on network 58, subject to the policies applied by server 78 and charges applied by server 82.

The foregoing is a general structure of a system which can be modified and varied according to desired implementations. In an exemplary implementation, the components in system 50 are operated by a single carrier C, and subscriber S is a subscriber to that carrier C. Also in this example, subscriber S has a post-paid subscription with carrier C and thus subscriber S is billed on a periodic basis, typically monthly, for services utilized with carrier C.

Policy server 78 maintains a policy P that reflects a policy for the control of various types of services that subscriber S may wish to access on network 58. (Note that in a present embodiment a single policy P is maintained for a given subscriber S, but in other embodiments multiple policies can be maintained for a given subscriber. For example, one policy could be maintained for subscriber S based on subscriber S's business use, while another policy could be maintained for subscriber S based on subscriber S's personal use. As another example, different policies could be maintained for multiple devices that are operated by the same subscriber, depending on which device was active when the subscriber attempted to access the particular service.)

Table I shows exemplary contents of policy P.

TABLE I

Exemplary contents of Policy P

| Entry | Field 1 Subscriber ID | Field 2 Service | Field 3 Bit Rate | Field 4 Volume | Field 5 Usage Period | Field 6 Excess Permitted |
|---|---|---|---|---|---|---|
| 1 | S | VT1 - VOIP tel 1 | 115 kbps | 100 MB | Day | Yes |
| 2 | S | VT2 - VOIP tel 2 | 75 kbps | 20 minutes | 8AM–6PM | No |
| 3 | S | VT2 - VOIP tel 2 | 115 kbps | Unlimited | 6PM–8PM | N/A |
| 4 | S | VT3 - VOIP tel 3 | Not allowed | Not allowed | N/A | N/A |
| 5 | S | TC1 - Text chat 1 | 1 kbps | Unlimited | Unlimited | N/A |
| 6 | S | TC2 - Text chat 2 | Not allowed | Not allowed | Not allowed | N/A |
| 7 | S | DM1 - Dynamic Map 1 | 25 kbps | 2 MB | Day | Yes |
| 8 | S | VS1 - Video stream 1 | 155 kbps | 500 MB | Weekends only | No |
| 9 | S | MS1 - Music stream 1 | 25 kbps | 50 songs | Day | N/A |
| 10 | S | PP1 - Peer to Peer 1 | 30 kbps | 100 MB | Day | No |
| 11 | S | U - Unknown Service | 115 kbps | 10 MB | Day | No |
| 12 | S | AGGREGATE | 200 kbps | 600 MB | Day | Yes |
| 13 | S | PROFILE | N/A | N/A | N/A | N/A |

Explaining the structure of Table I in greater detail, Field 1 of Table I, entitled "Subscriber ID," is an identifier that is uniquely associated with subscriber S. The identifier can either be specific to device 70, or specific to subscriber S contemplating that subscriber S could authenticate with different computing devices and still be subject to the same policy P. (While not discussed herein, where subscriber S is permitted to authenticate with different computing devices, then policy P could be further enriched, beyond what is shown in Table I, to vary the policy according to the computing device, or even the nature of links connecting the device to network 58.) Field 2 of Table I, entitled "Service," identifies the various types of services that are subject to the policy P. As will be explained in greater detail below, services can include any suitable type of service that is currently known or as yet unknown, including voice telephony, chat, video streaming, music streaming and the like. Field 3 of Table I, entitled "Bit Rate," is the maximum permitted bit rate associated with a particular service. Field 4 of Table I, entitled "Volume," is the maximum amount of data that can be downloaded to device 70 and uploaded from device 70. Field 5 of Table I, entitled "Usage Period," defines the period during which the volume defined in Field 4 is measured. That is to say, where usage period indicates "Day" and Volume indicates "1 MB", then the subscriber will be permitted one Megabyte of data transfer during one day. Field 6 of Table I, entitled "Excess Permitted," defines whether the subscriber is permitted to exceed the limits defined in Fields 4 and 5. Such excess may be permitted should the subscriber S agree to be subject to increased billing rates, and/or the sacrifice of limits for other services, and/or some other consideration in exchange for being permitted to exceed the limits defined in Fields 4 or 5. Those skilled in the art will recognize that Fields 3, 4, 5 and 6 can be each divided into two separate fields, one for up stream traffic from device 70 to network 58 and the other for downstream traffic from network 58.

Explaining each exemplary service in greater detail, "VT1—VOIP tel 1" in Field 2, Entry 1 identifies a VOIP telephony service that is offered by a first service provider. For example "VT1—VOIP tel 1" could be the well known VOIP application Skype, available at http://www.skype.com. Likewise, "VT2—VOIP tel 2" in Field 2, Entry 2 and Field 2, Entry 3 identifies a VOIP telephony service that is offered by a second service provider different from the first service provider. Likewise, "VT3—VOIP tel 3" in Field 2, Entry 4 identifies a VOIP telephony service that is offered by a third service provider different from the first service provider.

"TC1—Text chat 1" in Field 2, Entry 5 identifies a "chat" service that is offered by a first service provider. For example "TC1—Text chat 1" could be the well known chat application, Google Talk, available at http://www.google.com. Likewise "TC2—Text chat 2" in Field 2, Entry 6 identifies another "chat" service that is offered by a second service provider, such as Microsoft Instant Messenger, available at http://www.microsoft.com.

"DM1—Dynamic Map 1" in Field 2, Entry 7 identifies a mapping program that is offered by a first service provider. For example, "DM1—Dynamic Map 1" could be the well known map application Google Maps, available at http://www.google.com.

"VS1—Video stream 1" in Field 2, Entry 8 identifies a streaming video application that is offered by a first service provider. For example, "VS1—Video stream 1" could be based on the well known web-site "You Tube," available at http://www.youtube.com.

"MS1—Music stream 1" in Field 2, Entry 9 identifies a streaming audio application that is offered by a first service provider. For example, "MS1—Music stream 1" could be based on the well known web-site Pandora, available at http://www.padora.com.

"PP1—Peer to Peer 1" in Field 2, Entry 10 identifies a peer-to-peer application that is used between client devices for the purpose of transferring applications or multi-media files, for example, Bittorrent, available at http://www.bittorrent.com.

"U—Unknown Service" in Field 2, Entry 11 is a catchall for identifying any application that is being accessed and for which policy server 78 is unable to identify. Field 2, of Entry 11 can be particularly important as new services, including web sites and applications, become available and for which are not classified by policy server 78, or for which subscriber S is simply accessing for the first time.

"Aggregate" in Field 2, Entry 12 identifies the aggregate upper-bound in terms of bandwidth and capacity that may be offered to subscriber S over a given chronological period irrespective of any other entry. Note that the previous entries in aggregate may or may not exceed the values prescribed in entry 12. Those skilled in the art will recognize that this entry may be used to provide class of service controls for a given subscriber while providing relatively granular controls on a per subscriber and application basis via the other entries.

Examining Table I thus shows a plurality of different policies that are defined for a plurality of different services. Entry 1 thus defines that subscriber S can make VOIP telephony calls using the service VT1—VOIP tel 1, and be permitted to a maximum bit rate over the link 74 of one-hundred-and-fifteen kilobits per second ("kbps"), provided that the total volume of packets does not exceed one hundred megabytes per day. However, if the total of volume of packets does exceed one hundred megabytes per day, then policy P notes that there is additional consideration provided by subscriber S to allow this excess.

Entry 2 of Table I defines that subscriber S can make VOIP telephony calls using the service VT2—VOIP tel 2, and be permitted to a maximum bit rate over the link 74 of seventy-five kbps, provided that the total volume of calls does not exceed twenty minutes between the hours of 8:00 AM and 6:00 PM. No excess minutes are permitted, and thus subscriber S is no longer permitted to make VOIP telephony calls using the service VT2—VOIP tel 2 between the hours of 8:00 AM and 6:00 PM if subscriber S has used more than twenty minutes of time. Of note, usage for VT2—VOIP tel 2 is measured differently than for VT1—VOIP tel 1, demonstrating the flexibility of policy criteria. Also of note is that subscriber S will have a poorer quality of service due to the lower bit rate that is permitted.

Entry 3 of Table I defines that subscriber S can make VOIP telephony calls using the service VT2—VOIP tel 2, and be permitted to a maximum bit rate over the link 74 of one-hundred-and-fifteen kbps, for an unlimited number of minutes between the hours of 6:00 PM and 8:00 AM. Thus, during these hours, subscriber S can use either VT2—VOIP tel 2 or VT1—VOIP tel 1 and benefit from the same bit rate.

Entry 4 of Table I defines that subscriber S is not permitted to make VOIP telephony calls using the service VT3—VOIP tel 3.

Entry 5 of Table I defines that subscriber S can conduct on-line chatting using the service TC1—Text chat 1 at a maximum bit rate of 1 kbps, and can make use of that service for an unlimited volume over any time period.

Entry 6 of Table I defines that subscriber S is not permitted to conduct on-line chatting using the service TC2—Text chat 2.

Entry 7 of Table I defines that subscriber S can obtain mapping information and directions using the service "DM1—Dynamic Map 1" at a bit rate of 25 kbps provided that not more than two megabytes of data is used in one day, at which point the subscriber is subject to an excess usage policy.

Entry 8 of Table I defines that subscriber S can access VS1—Video Stream 1 at a bit rate of up to 155 kbps, on weekends only, provided that no more than five hundred megabytes of data is used on those weekends. For video services (or indeed, any of the other types of services), it can also be desired to set policy based on the access technology that is currently being used. For example, it can be desired to allow higher bit rates for video streams when the access technology is based on Universal Mobile Telecommunications System ("UMTS"), and a lower bit rate when the access technology is based on General Packet Radio Service ("GPRS").

Entry 9 of Table I defines that subscriber S can access MS1—Music Stream 1 at a bit rate of 25 kbps, and up to a maximum of fifty songs in a single day. No excess usage is permitted.

Entry 10 of Table I defines that subscriber S can use the PP1—Peer to Peer 1 application at a bit rate of 30 kbps, and up to a maximum of 100 megabytes per day. No excess usage is permitted.

Entry 11 of Table I defines that subscriber S can access any other service, not expressly defined in Table I at a bit rate of up to one-hundred-and-fifteen kbps, and up to a maximum volume of 10 megabytes in a day, but no excess usage is permitted.

Entry 12 of Table I defines that a subscriber S can access any previously prescribed service up to an aggregate upper bound up to 200 kbps, and up to a maximum of 600 megabytes per day. Note that the previous entries in aggregate may or may not exceed the values prescribed in Entry 12—Entry 12 only pertains to the actual aggregate usage.

Entry 13 of Table I indicates that there is other service information that can be used to define the application centric policy attributes for a given subscriber that is stored in an off-board profile server. Such a profile server can be implemented according to the teachings of U.S. patent application Ser. No. 11/516,308, entitled "Method And System For Active Profile Server," filed Sep. 6, 2006, the entire contents of which are incorporated herein by reference.

Those skilled in the art will now be able to examine Table I and ascertain the specific scope of each exemplary policy that is outlined. Those skilled in the art will also recognize variations as to the scope and nature of the policy. For example, Entry 11 of Table I could be defined to never allow access to any service (or to maintain a black list of certain services) that is not expressly defined in the other entries of Table I.

Accounting server 82 maintains account information A that reflects the charges and billing arrangements associated with subscriber S. Table II shows exemplary contents of accounting information A.

Field 4 of Table II, entitled "Basic Rate," indicates the rate that is charged for a particular service if that subscriber S accesses that service from within carrier C's coverage area, and according to the corresponding data in Fields 3, 4 and 5 of Table I. Field 5 of Table II, entitled "Excess Rate," indicates the rate that is charged for a particular service if that subscriber S accesses that service from within carrier C's coverage area, and according to whether excess usage is permitted as per Fields 6 Table I. Field 7 of Table II, entitled "Roaming Rate," indicates the rate that is charged for a particular service if that subscriber S does not access that service from within carrier C's coverage area, but instead within the coverage area of another carrier. With respect to entry 12, fields 5-7 provide for an upper bound for applied charges over a given chronological period for the consumption of basic and excess services, as well as the consumption of services in a roaming environment. Those skilled in the art will recognize that this provides for a means to mitigate inadvertent utilization of one or more services as well as mitigate fraud. Those skilled in the art will also recognize that a plurality of different policies can be defined for roaming versus non-roaming services. Entry 13 of Table II indicates that there is other service information that can be used to define the application-centric rating attributes for a given subscriber that is stored in an off-board profile server. Again, such a profile server can be implemented according to the teachings of U.S. patent application Ser. No. 11/516,308, entitled "Method And System For Active Profile Server," filed Sep. 6, 2006, the entire contents of which are incorporated herein by reference.

Those skilled in the art will now be able to examine Table II, in conjunction with Table I, and ascertain the specific scope of charges and fees that are associated with each policy that is outlined in Table I. Those skilled in the art will also recognize that policy P and accounting information A collectively represent a unique service offering that can be made by

TABLE II

Exemplary contents of Accounting information A

| Entry | Field 1 Subscriber ID | Field 2 Service | Field 3 Billing arrangement | Field 4 Basic Rate | Field 5 Excess Rate | Field 6 Roaming Rate | Field 7 Prepaid Balance |
|---|---|---|---|---|---|---|---|
| 1 | S | VT1 - VOIP tel 1 | Postpaid | $10.00/MB | $20.00/MB | $30.00/MB | N/A |
| 2 | S | VT2 - VOIP tel 2 | Prepaid | $.25/minute | $50/minute | $1.50/minute | $Zero |
| 3 | S | VT2 - VOIP tel 2 | Postpaid | $.15/minute | $.25/minute | $1.25/minute | N/A |
| 4 | S | VT3 - VOIP tel 3 | Not allowed | Not allowed | N/A | N/A | N/A |
| 5 | S | TC1 - Text chat 1 | Postpaid | $2.00/MB | $3.00 MB | $3.00 MB | N/A |
| 6 | S | TC2 - Text chat 2 | Postpaid | Not allowed | Not allowed | Not allowed | N/A |
| 7 | S | DM1 - Dynamic Map 1 | Postpaid | $4.00/MB | $6.00/MB | $10.00/MB | N/A |
| 8 | S | VS1 - Video stream 1 | Prepaid | $4.00/MB | $6.00/MB | $10.00/MB | $25.00 |
| 9 | S | MS1 - Music stream 1 | Postpaid | $1.00/song | $1.50/song | $2.00/song | N/A |
| 10 | S | PP1 - Peer to Peer 1 | Postpaid | $0.50/MB | $1.00/MB | Not allowed | N/A |
| 11 | S | U - Unknown Service | Postpaid | $20.00/MB | N/A | N/A | N/A |
| 12 | S | AGGREGATE | N/A | $200/Month | $100/Month | $200/Month | N/A |
| 13 | S | PROFILE | N/A | N/A | N/A | N/A | N/A |

Explaining Table II in greater detail, Field 1 of Table I, entitled "Subscriber ID," is the same as the subscriber ID in Table I that is uniquely associated with subscriber S. Field 2 of Table II, entitled "Service," identifies the various types of services that are subject to the policy P which are the same as those services as previously described in relation to Table I. Field 3 of Table II, entitled "Billing Arrangement," indicates whether a particular service is on a post paid or prepaid basis. (In other embodiments, the fact of whether each service is postpaid or prepaid could simply be based on whether a given subscriber is identified as a prepaid or postpaid subscriber.)

carrier C to subscriber S, according to subscriber S's unique and personal selections for access to such services.

As will be explained in greater detail below, GGSN 54 is operable to ascertain the identity of various services that are being accessed on network 58 by subscriber S, and to relay that information to policy server 78. Policy server 78 is, in turn, operable to access policy P, and make appropriate inquiries to accounting server 82, in order to selectively permit or deny access to a particular service, and where such access is permitted, to control how that access is provided, all in accordance with policy P and accounting information A.

Likewise, information about such access to services is relayed to accounting server 82 so that the subscriber's account can be correspondingly updated according to the service usage.

Figure 2:
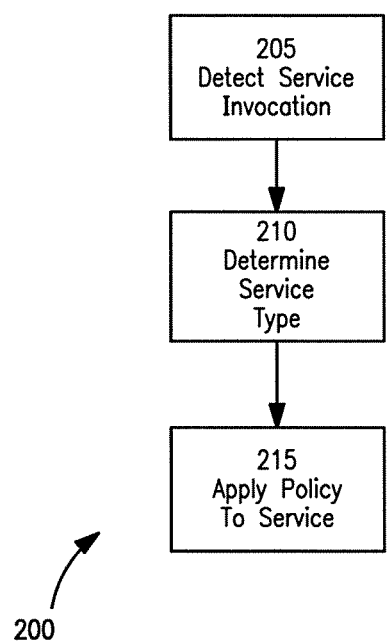
FIG. 2 shows a flowchart depicting a method for applying policies to services.

Referring now to FIG. 2, a method for applying policies to services is indicated generally at 200. For purposes of explaining the present embodiment, it will be assumed that method 200 is performed on system 50. However, it should be understood that method 200 need not be performed on system 50, and other methods can be performed on system 50. Likewise, it should be understood that both system 50 and method 200 can be varied. For example, steps in method 200 need not be performed in the exact sequence shown.

Figure 3:
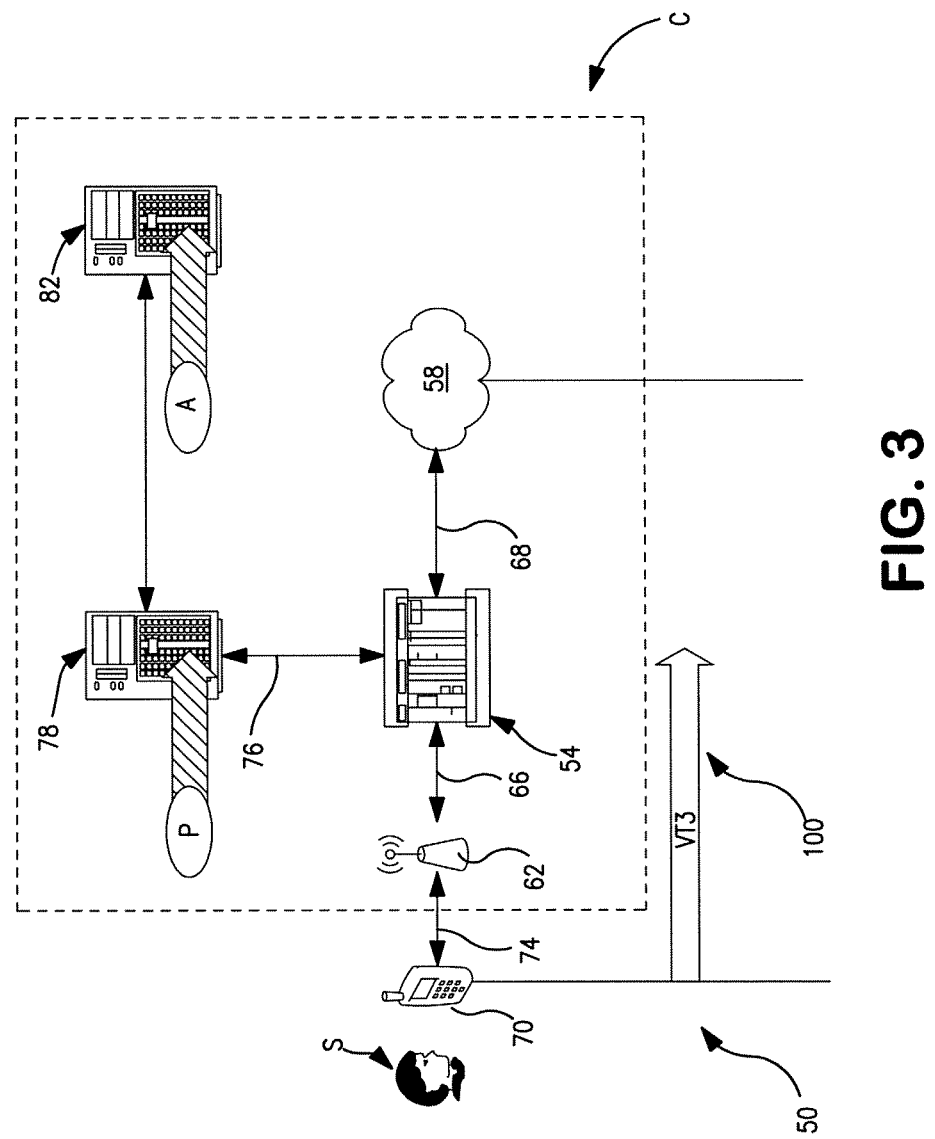
FIG. 3 shows the system of FIG. 1 during exemplary performance of certain steps in FIG. 2.

Beginning first at step 205, the invocation of a particular service is detected. Step 205 is performed by GGSN 54 which examines traffic between subscriber S and network 58 that is being carried via GGSN 54 in order to ascertain the particular services that are being accessed. Exemplary performance of step 205 is shown in FIG. 3, where subscriber S is shown having invoked a service, as represented by arrow 100.

Figure 4:
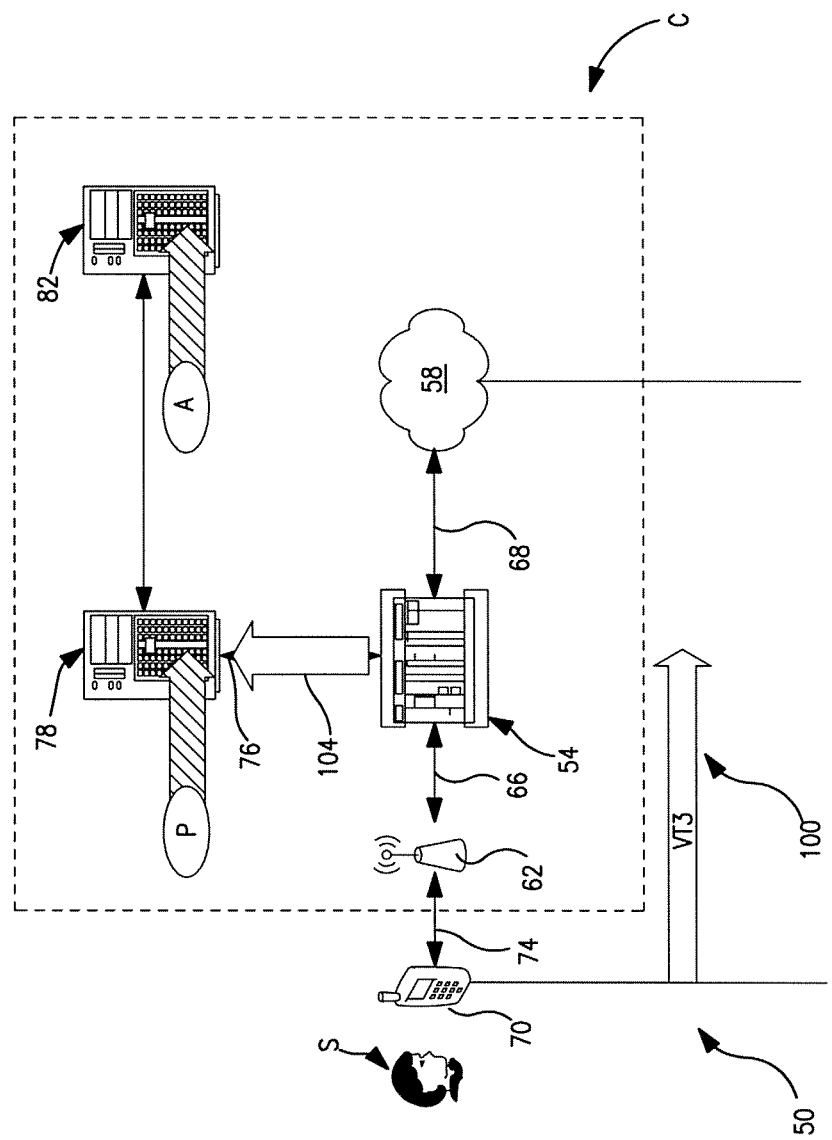
FIG. 4 shows the system of FIG. 1 during exemplary performance of certain steps in FIG. 2.
Figure 5:
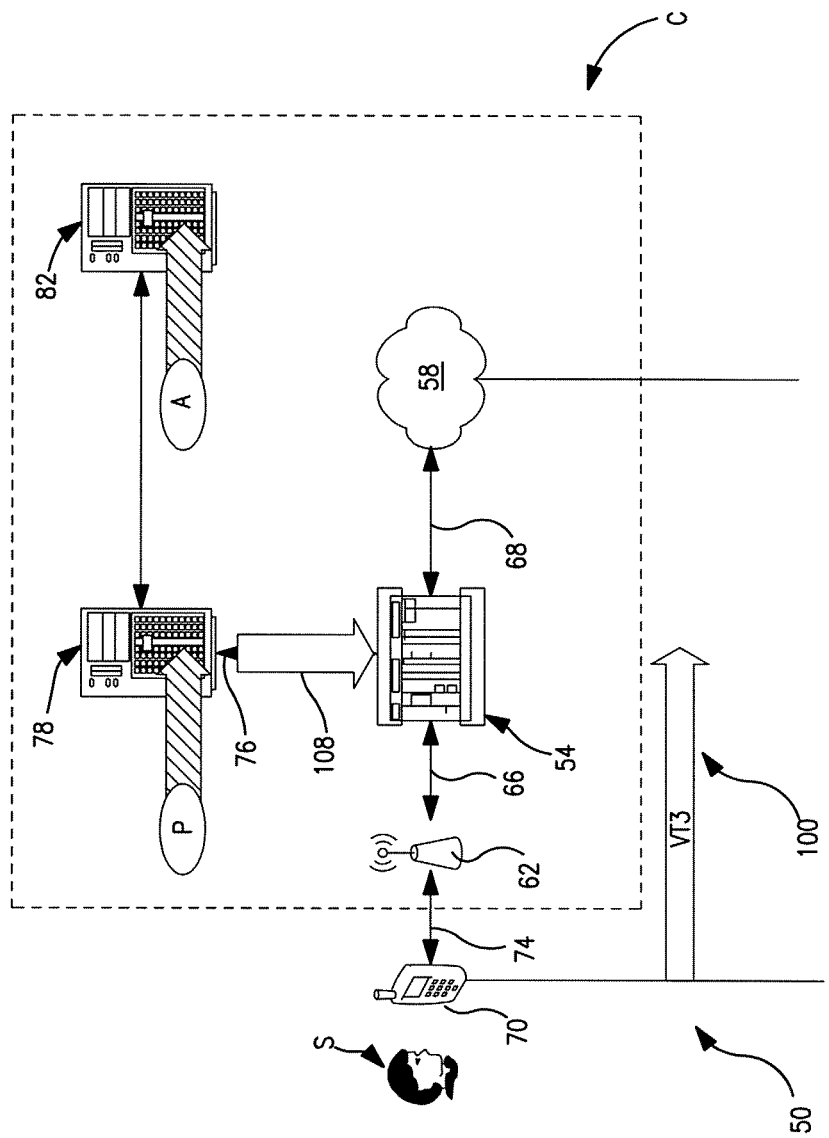
FIG. 5 shows the system of FIG. 1 during exemplary performance of certain steps in FIG. 2.
Figure 6:
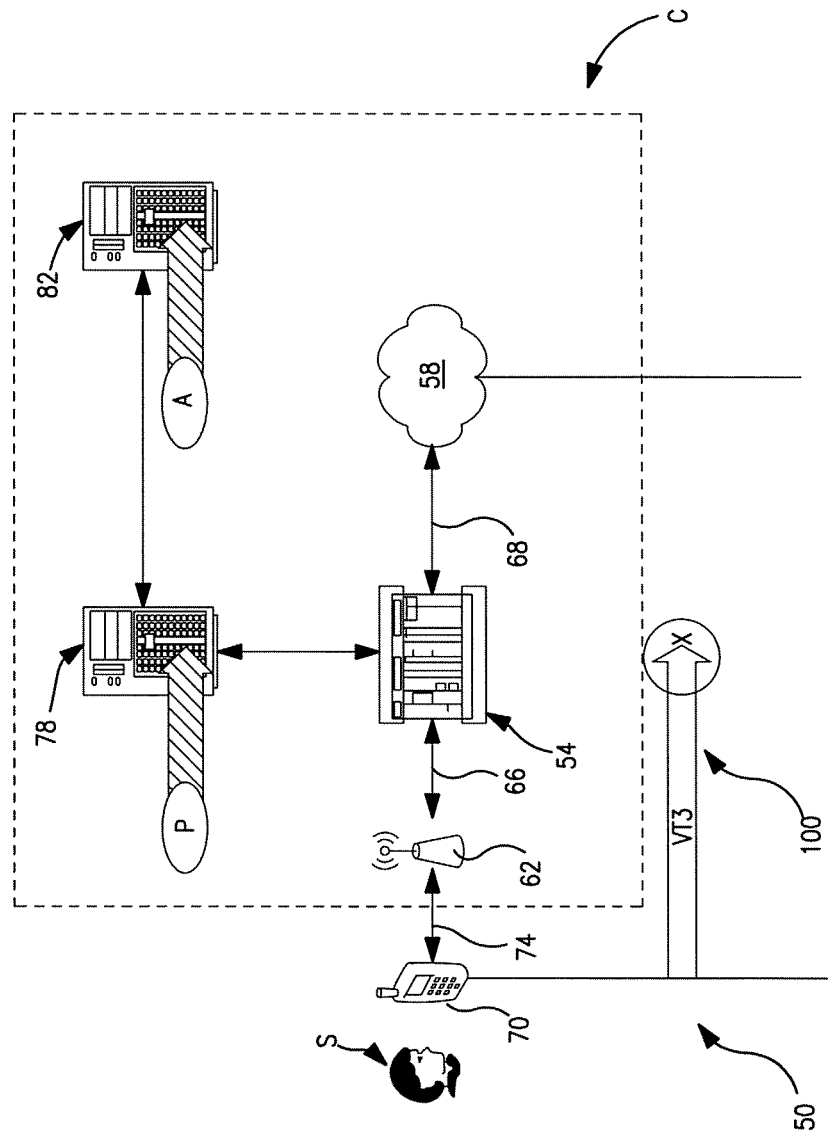
FIG. 6 shows the system of FIG. 1 during exemplary performance of certain steps in FIG. 2.

Next, at step 210, the nature of the service invoked at step 205 is determined. In the present example, service 100 is VT3. Determination of the type of service is performed using inherent functionality of the GGSN 54 as the policy enforcement point. Those skilled in the art will recognize that there are a variety of methods for defining and recognizing application and subscriber centric data flows of interest per parametric information that is inherent in the flow of bearer data as well as information that may be conveyed from another network elements (for example, the call session control function (CSCF) in a 3GPP or 3GPP2 based environment) or the associated application server via a RADIUS, DIAMETER, or session initiation protocol (SIP) based interface. Those skilled in the art will recognize that the methods of identifying and classifying distinct subscriber and application specific bearer flows are collectively referred to as "deep packet inspection" capabilities. With respect to parametric information that is inherent in the bearer data flow that can be used to identify and classify subscriber or application specific data flows, this may include the source and destination internet protocol addresses, port information, protocol information, and other suitable information that conveys the access technology used (such as the Radio Access Technology parameter). Information that may be conveyed from another network element or the associated application server may include the application identifier, flow identifiers, and the media type(s) associated with a given service or application. In addition to the utilization of explicit addressing or application information inherent in the data flow or conveyed from external network elements or application servers, the policy enforcement point may recognize patterns or characteristic traffic flows as indicative "signatures" that are associated with a given service or application. Accordingly, GGSN 54 will determine that the subscriber S has attempted to invoke service VT3—VOIP tel 3 by examining the destination Next, at step 215, the policy is applied to the service. In a present embodiment, step 215 is performed by GGSN 54 first making an inquiry 104 that is directed to policy server 78. Inquiry 104 is represented by an arrow indicated at reference 104 in FIG. 4. Inquiry 104 is carried via link 76. In response to inquiry 104, policy server 78 examines policy P to examine what policy is to be applied to subscriber S accessing service VT3. Thus, server 78 examines Entry 4 of Table I and determines that access to service VT3 is not permitted. Next, server 78 sends a reply 108 to GGSN 54. Reply 108 is represented by an arrow indicated at reference 108 in FIG. 5. Reply 108 is carried via link 76. Reply 108 indicates to GGSN 54 that the service VT3 is not permitted. Upon receiving reply 108 at GGSN 54, GGSN 54 applies the policy. The application of the policy by GGSN 54 is represented in FIG. 6 by an encircled X shown on the tip of service 100, and likewise service 100 is shown in dotted lines, representing that the invocation of service 100 is never permitted to reach network 58, and, thus, the subscriber S will receive a message indicating that connection with network 58 for service 58 was not successful and/or not permitted.

Figure 7:
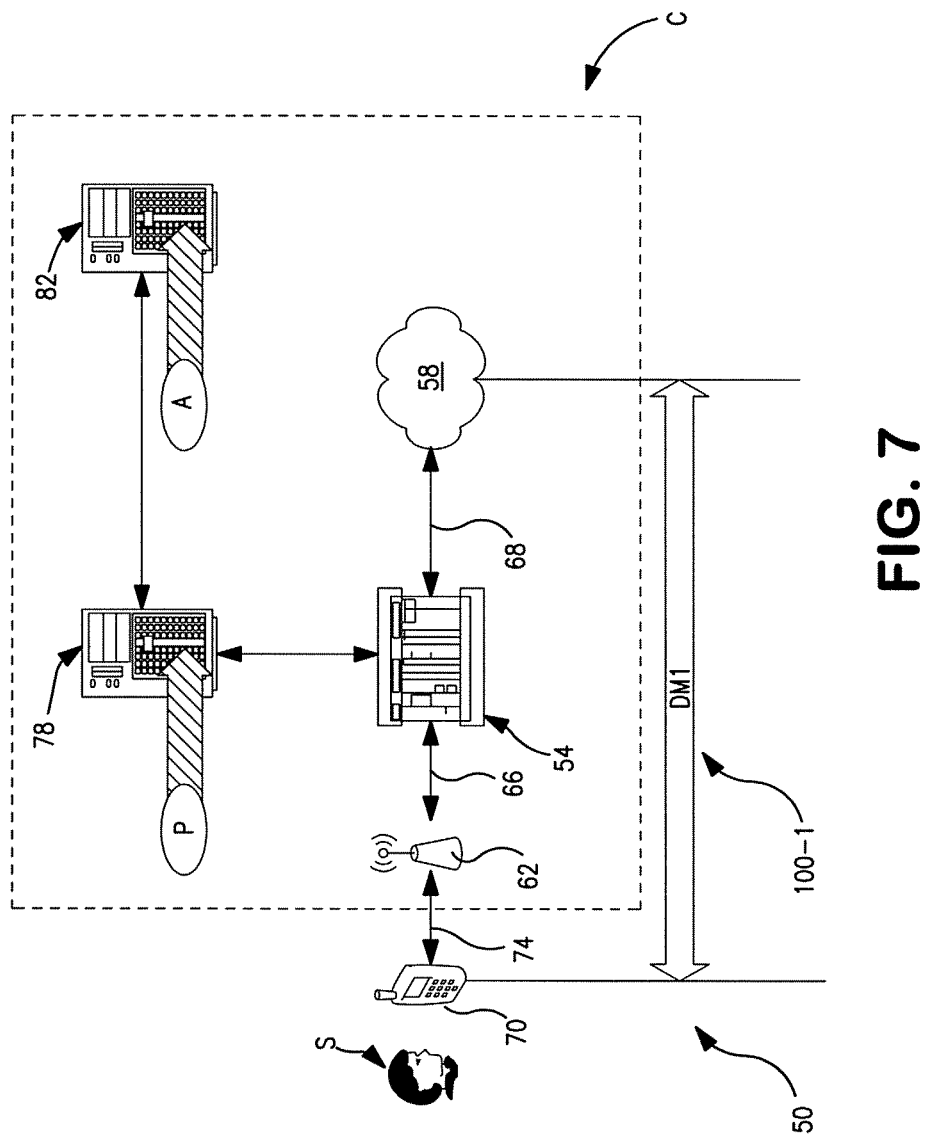
FIG. 7 shows the system of FIG. 1 during exemplary performance of certain steps in FIG. 2.

The foregoing exemplary discussion of method 200 resulted in the blocking of an attempt to access a service by subscriber S. However, it should be understood that it is contemplated that various services will indeed be permitted. Assume for purposes of illustration that during the performance of method 200 subscriber S attempts to access the service DM1—Dynamic Map 1. During this performance of method 200, subscriber S will be permitted to access this service, since access to this service is permissible according to entry 7 of Table I. Such performance is represented in FIG. 7 as service 100-1 that is represented by a double-headed arrow labeled DM1. Service 100-1 represents that traffic is being carried between network 58 and subscriber S via GGSN 54. GGSN 54 will, however, limit the bandwidth of service 100-1 to 25 kbps in accordance with entry 7 of policy P in Table I.

Figure 8:
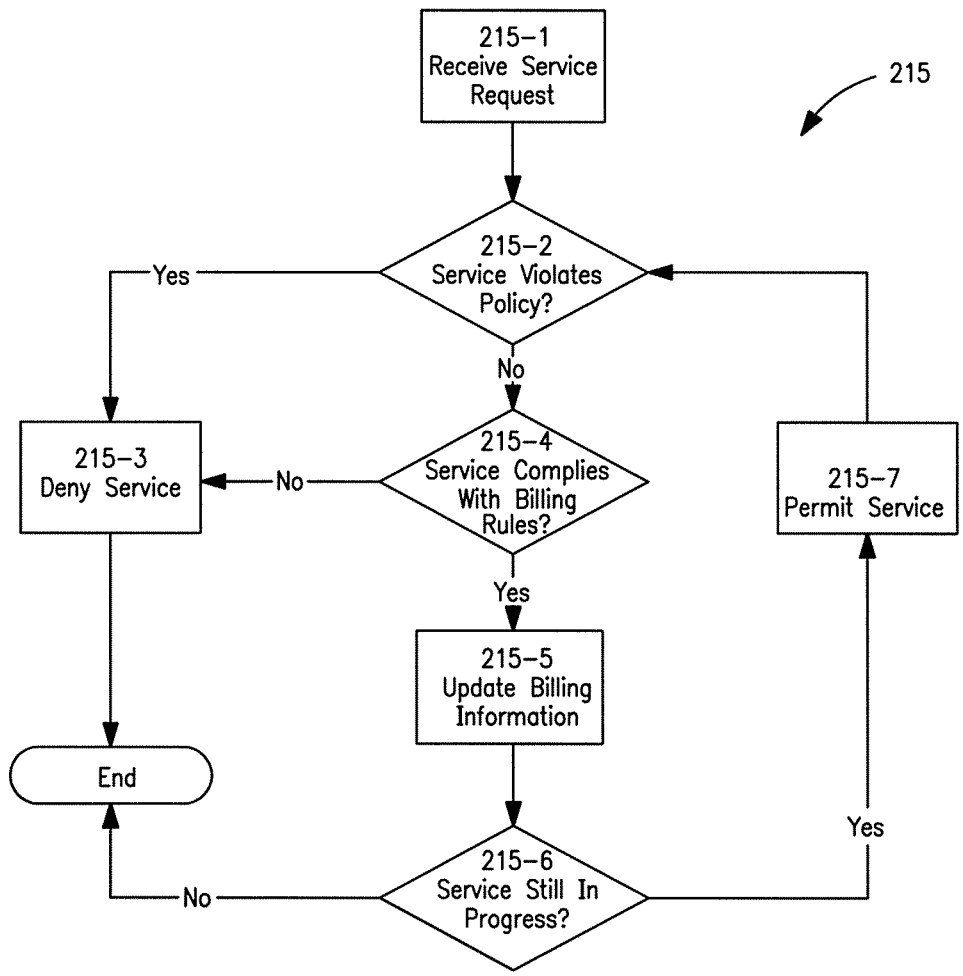
FIG. 8 shows a flowchart depicting an exemplary method for performing one of the steps shown in FIG. 3.

Also of note, is that server 78 will cooperate with server 82 to instruct GGSN 54 to selectively permit or deny service. FIG. 8 shows an example of how step 215 of FIG. 2 can be implemented. Step 215-1, request to receive service, can be implemented in substantially the same manner as previously described, whereby inquiry 104 is carried from GGSN 54 to server 78. Step 215-2 is performed by server 78, which examines inquiry 104 and compares it with Table I to ascertain the relevant policy. If at step 215-2 it is determined that the service request violates the policy P, then the method advances to step 215-3 and the service is denied, much as described above in relation to FIG. 6.

If at step 215-2 it is determined that the service request does not violates the policy P, then the method advances to step 215-4 and a determination is made as to whether the service request complies with the billing rules. Step 215-4 is performed by first having server 78 pass the request to server 82. In turn, server 82 will examine accounting information A. For example, if subscriber S attempts to access VT2—VOIP tel 2, then at step 215-2 it would be determined that no policy is being violated by such a request, but, at step 215-3 it would be determined, upon examining accounting information A in Table II, that the service request does not comply with billing rules, since VT2—VOIP tel 2 is a prepaid service and subscriber S has a "zero" account balance. Thus, in this example, the method would advance from step 215-4 to step 215-3 and the service request would be denied, much as described above in relation to service 100 in FIG. 6.

As an alternative example, assume subscriber S attempts to access MS1—Music Stream 1 for the first time during a given day, then at step 215-2 it would be determined that no policy is being violated by such a request, and then at step 215-3 it would be determined that the service request also complies with billing rules, and that subscriber S is to be billed $1.00 for downloading the song. The method would then advance to step 215-5 and the billing information for subscriber S would be updated, adding $1.00 to the bill of the subscriber.

At step 215-6, it is determined if the service request is still in progress. If no, the method ends. If yes, then the method advances from step 215-6 to step 215-7 at which point the service would be permitted, much as described above in relation to service 100-1 in FIG. 7.

The method in FIG. 8 then loops back to step 215-2 to begin anew, and continue cycling until policy P is violated, or rules defined accounting information A is violated, or until the service is terminated by subscriber S.

While the foregoing presents certain embodiments and examples, it should be understood that various combinations, subsets and variations of the foregoing are contemplated. For example, for simplicity sake system 50 is shown with a single subscriber, but in a typical installation each policy P, and associated accounting information A, would include records for a plurality of subscribers. As another example, while policy server 78 and accounting server 82 are shown as two separate entities, in other embodiments it should be understood that policy server 78 and accounting server 82 can be implemented on a single server.

As another example, the teachings herein can be incorporated into the Applicant's co-pending application, U.S. patent application Ser. No. 11/516,308, entitled "Method And System For Active Profile Server," filed Sep. 6, 2006, the entire contents of which are incorporated herein by reference.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for applying a policy to a service comprising:
   maintaining, in association with a policy server, a database representing a policy for accessing a plurality of services for a subscriber; each said service including at least one of an identity of a provider of said service and a type of said service; said policy indicating for each said service whether access to said service for said subscriber is permitted;
   receiving, at a policy enforcement point, a request from a client device operated by said subscriber for access to one of said services;
   determining, at said policy enforcement point, a type of said service;
   forwarding said type of service from said policy enforcement point in a format configured for an online or offline charging system;
   receiving said type of service at said policy server, said policy server configured to emulate said online or offline charging system so as to receive said type of service in said format configured for said online or offline charging system;
   determining, at said policy server, whether said request complies with said policy;
   forwarding, from said policy server to said policy enforcement point, in said format configured for said online or offline charging system, data representing an instruction to said policy enforcement point to either permit or deny said client device to access said service according to said policy.

2. The method according to claim 1 wherein said policy includes a maximum bit rate at which said one of said services can be accessed and said permitting step includes ensuring that said one of said services does not exceed said maximum bit rate.

3. The method according to claim 1 wherein said policy includes a predefined maximum volume and said permitting step includes monitoring a volume of data for said one of said services that can be accessed such that once said predefined maximum volume is reached then performing said denying step.

4. The method according to claim 1 wherein said policy includes a predefined maximum aggregate bit rate for all services that can be accessed and said permitting step includes ensuring that said services do not exceed said predefined maximum aggregate bit rate.

5. The method according to claim 1 wherein said policy includes a predefined maximum aggregate volume for all services that can be accessed by said client device and said permitting step includes monitoring a volume of data for said one of said services that can be accessed such that once said predefined maximum aggregate volume is reached then performing said denying step.

6. The method according to claim 1 wherein said policy includes a permitted usage period for said one of said services and performing said permitting step if said request occurs during said usage period and performing said denying step if said request does not occur during said usage period.

7. The method according to claim 1, further comprising the step of accessing, from said policy server, via an online or offline charging system, billing rules associated with said one of said services and permitting only if access to said one of said services also complies with said billing rules; said billing rules in a format configured for said online or offline charging system.

8. The method of claim 7 wherein billing rules include whether said one of said services is accessible on a post-paid or pre-paid basis.

9. The method of claim 7 wherein said billing rules include a basic rate for accessing said one of said services.

10. The method of claim 7 wherein said billing rules include an excess rate for accessing said one of said services.

11. The method of claim 7 wherein said billing rules include a roaming rate for accessing said one of said services.

12. A system for applying policies to services comprising:
   a policy enforcement point configured to communicate with an online or offline charging system;
   a client device connected to said policy enforcement point;
   a network connected to said policy enforcement point configured to provide one of a plurality of services to said client device;
   a policy server connected to said policy enforcement point; said policy server configured to emulate an online or offline charging system so as to communicate with said policy enforcement point in a format configured for said online or offline charging system; said policy server configured to maintain a database representing a policy for accessing said plurality of services for a subscriber operating said client device; each said service including at least one of an identity of a provider of said service and a type of said service; said policy indicating for each said service whether access to said service for said subscriber is permitted;
   said policy enforcement point configured to:
      receive a request from said client device for access to one of said services;
      determine a type of said service;
      forward said type to said policy server in said format configured for said online or offline charging system;
      receive a response from said policy server in said format configured for said online or offline charging system;
      permit or deny said client device to access said service according to said response.

13. The system of claim 12 wherein said policy includes a maximum bit rate at which said one of said services can be accessed and said policy enforcement point is configured to ensure that said one of said services does not exceed said maximum bit rate.

14. The system of claim 12 wherein said policy includes a predefined maximum volume and said policy enforcement point is configured to monitor a volume of data for said one of said services that can be accessed such that once said predefined maximum volume is reached then performing said policy enforcement point denies access to said one of said services.

15. The system of claim 12 wherein said policy includes a predefined maximum aggregate bit rate for all services that can be accessed and said policy enforcement point is configured to ensure that said services do not exceed said predefined maximum aggregate bit rate.

16. The system of claim 12 wherein said policy includes a predefined maximum aggregate volume for all services that can be accessed by said client device and said policy enforcement point is configured to monitor a volume of data for said one of said services that can be accessed such that once said predefined maximum aggregate volume is reached then said policy enforcement point denies access to said one of said services.

17. The system of claim 12 wherein said policy includes a permitted usage period for said one of said services and if said request occurs during said usage period then said policy enforcement point is configured to permit access to said one of said services and if said request occurs outside said usage period then said policy enforcement point is configured to deny access to said one of said services.

18. The system of claim 12 further comprising an accounting server implementing an online or offline charging system; said accounting server connected to said policy server and configured to maintain billing rules associated with said one of said services; said policy server further configured to access said accounting server in said format configured for said online or offline charging system; said policy server configured to permit or deny said services based on a response from said accounting server.

19. The system of claim 18 wherein billing rules include whether said one of said services is accessible on a post-paid or pre-paid basis.

20. The system of claim 18 wherein said billing rules include a basic rate for accessing said one of said services.

21. The system of claim 18 wherein said billing rules include an excess rate for accessing said one of said services.

22. The system of claim 18 wherein said billing rules include a roaming rate for accessing said one of said services.

23. The system of claim 12 wherein said policy enforcement point is a general packet radio service (GPRS) support node ("GGSN") and said policy server is configured to appear to said GGSN as an accounting server.

24. The system of claim 12 wherein said policy enforcement point is selected from the group consisting of a packet serving data node (PDSN) for a code division multiple access (CDMA) based network; the Internet Protocol ("IP") edge router for a European Telecommunications Standards Institute ("ETSI") based network; the cable Modem termination system ("CMTS") for a PacketCable based network; an access service network ("ASN") gateway for a WiMax based network; and a deep-packet inspection node for a generic internet protocol based network.

* * * * *